United States Patent
Ramesh et al.

(10) Patent No.: US 8,635,608 B2
(45) Date of Patent: Jan. 21, 2014

(54) SOFTWARE UPDATE SYSTEM AND METHOD

(75) Inventors: Bhashyam Ramesh, Secunderabad (IN); Michael Watzke, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 1594 days.

(21) Appl. No.: 11/849,500

(22) Filed: Sep. 4, 2007

(65) Prior Publication Data

US 2009/0064123 A1    Mar. 5, 2009

(51) Int. Cl.
*G06F 9/45*    (2006.01)

(52) U.S. Cl.
USPC .................... 717/168; 717/170; 717/174

(58) Field of Classification Search
None
See application file for complete search history.

(56) References Cited

U.S. PATENT DOCUMENTS

| | | | |
|---|---|---|---|
| 6,769,054 B1* | 7/2004 | Sahin et al. | 711/162 |
| 7,072,796 B2* | 7/2006 | Kataoka | 702/181 |
| 7,103,874 B2* | 9/2006 | McCollum et al. | 717/121 |
| 7,630,967 B1* | 12/2009 | Srivastava et al. | 1/1 |
| 2005/0198630 A1* | 9/2005 | Tamma et al. | 717/175 |
| 2006/0101462 A1* | 5/2006 | Spears | 717/177 |
| 2006/0195837 A1* | 8/2006 | Fessler | 717/170 |
| 2007/0157195 A1* | 7/2007 | Gaa-Frost et al. | 717/174 |
| 2007/0234331 A1* | 10/2007 | Schow et al. | 717/168 |
| 2008/0077598 A1* | 3/2008 | Wilmering et al. | 707/100 |
| 2008/0271012 A1* | 10/2008 | Eykholt | 717/174 |

OTHER PUBLICATIONS

R. Brightwell, L.A. Fisk, D.S. Greenberg, T. Hudson, M. Levenhagen, A.B. Maccabe, R. Riesen, Massively parallel computing using commodity components, Parallel Comput. 26 (2000) 243-266.*

* cited by examiner

*Primary Examiner* — Anna Deng
*Assistant Examiner* — Matthew Brophy
(74) *Attorney, Agent, or Firm* — Michael Chan

(57) ABSTRACT

There is provided a method, system and computer program for updating at least one component in a multi-component software application. The method includes receiving application data describing characteristics of the software application, receiving update data describing at least one update applicable to the software application and reviewing the application data and update data to determine whether the at least one update is applied to the software application.

17 Claims, 3 Drawing Sheets

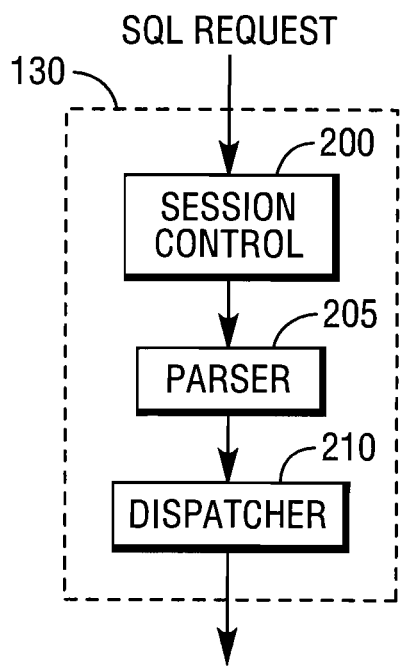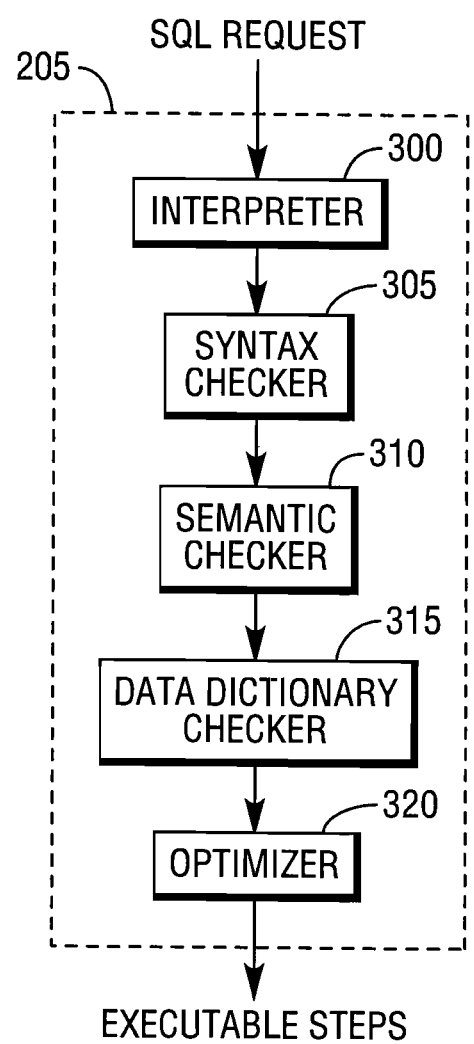

SOFTWARE UPDATE SYSTEM AND METHOD

BACKGROUND

Complex software applications, such as the Database Management System (DBMS) known as Teradata™ by NCR Corporation, release periodic updates, patches and/or maintenance modules to resolve problems and provide enhanced functionality. Many systems automatically apply these updates without a full consideration of the costs and benefits of applying the update.

In some cases, new releases may introduce unwanted changes, which can cause a degradation in performance (a regression), or at worst, a destabilization of the system. For example, an update which changes the SQL language parser in a database application may render some existing SQL scripts unusable. This in turn may cause certain jobs to abort, resulting in delays and frustration for users.

Where regressions are introduced, users or support personnel have to follow the tedious process of reviewing release notes to determine update applicability to a specific environment. In addition users have to review known regression issues to decide if a particular update is relevant to their environment.

SUMMARY

In general, in one aspect, the invention features a method for updating at least one component in a multi-component software application arranged to operate on a computing system. The method includes receiving application data describing characteristics of the software application, receiving update data describing at least one update applicable to the software application and reviewing the application data and update data to determine whether the at least one update is to be applied to the software application.

Implementations of the invention may include one or more of the following. The method may include the further step of receiving computing system data describing characteristics of the computing system and reviewing the computing system data to determine whether the at least one update is applied to the software application. At least one of the application data, update data and computing system data may be received in the form of a metadata record. The method may utilize a rule engine to perform the review of the application data and the update data. The rule engine may also be utilized to perform the review of the computing system data. A risk assessment report outlining the risk of applying the at least one update may be provided. The computer system data may be compiled by measuring the system resources utilized by the software application when executed on the computing system, or by recording a set of user-defined queries, or by recording a set of optimization strategies used by the software application when executing a query issued by a user, or any combination thereof. The method may include the further step of applying the update to the software application.

In general, in another aspect, the invention features a computing system. The computing system includes a massively parallel processing system, which includes one or more nodes, a plurality of CPUs, each of the one or more nodes providing access to one or more CPUs, a plurality of virtual processes each of the one or more CPUs providing access to one or more processes, each process configured to manage data stored in one of a plurality of data-storage facilities and an application data module configured to receive application data describing the software application, an update data module configured to receive update data describing at least one update applicable to the software application and a review module configured to review the application data and update data to determine whether the update should be applied to the software application.

In general, in another aspect, the invention features a computer program, stored on a tangible storage medium which includes instructions which cause a computing system to receive application data describing characteristics of the software application, receive update data describing at least one update applicable to the software application and review the application data and update data to determine whether the at least one update is to be applied to the software application.

Other features and advantages will become apparent from the description and claims that follow.

BRIEF DESCRIPTION OF THE DRAWINGS

FIG. 2 is a block diagram of a parsing engine.
FIG. 3 is a flow chart of a parser.

DETAILED DESCRIPTION

Figure 1:
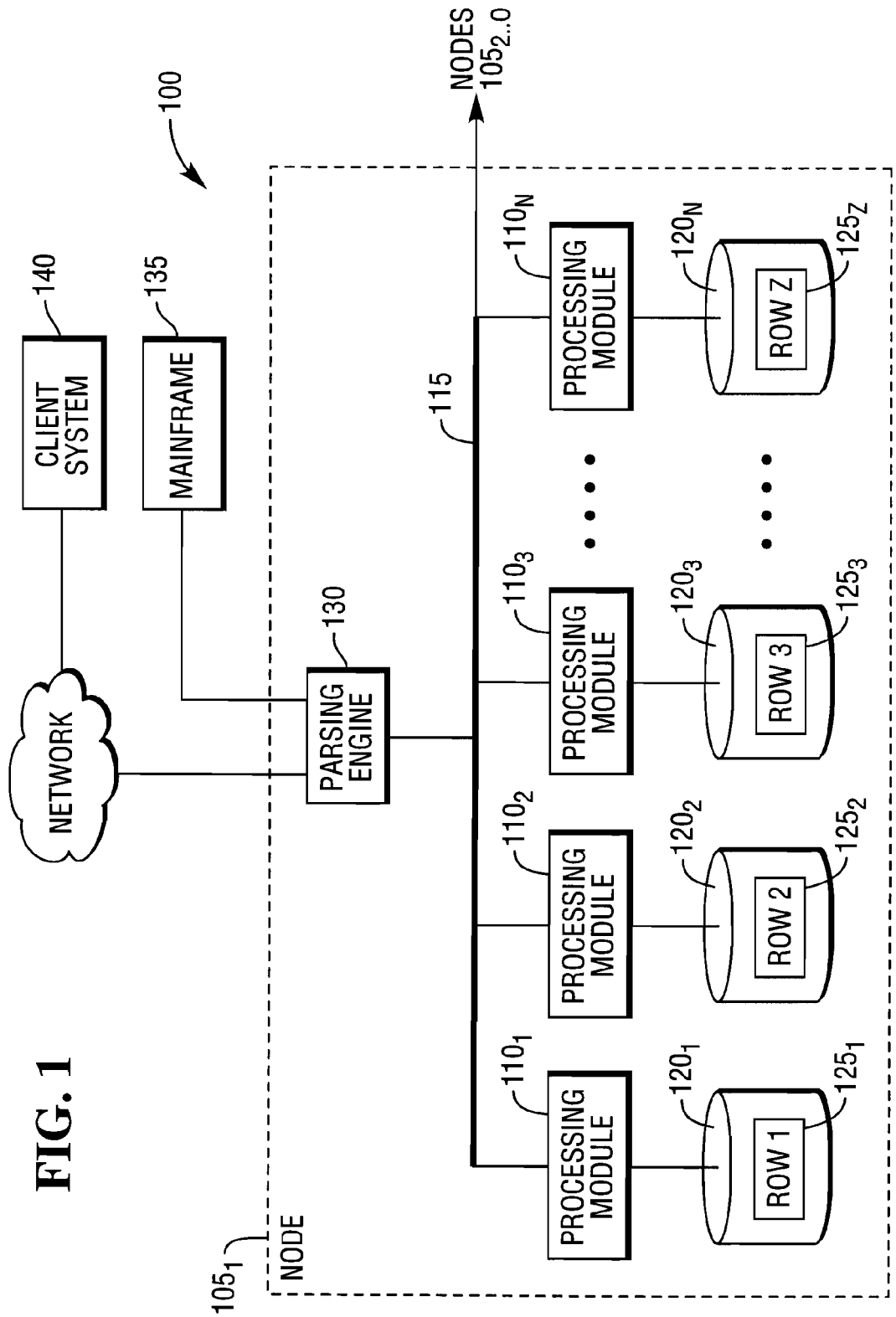
FIG. 1 is a block diagram of a node of a database system.

The technique disclosed herein has particular application to large software applications which are composed of a plurality of interdependent components. One such software application is a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_1 \ldots _N$, connected by a network 115 that manage the storage and retrieval of data in data storage facilities $120_1 \ldots _N$. Each of the processing modules $110_1 \ldots _N$ may be one or more physical processors or each may be a virtual processor, with one or more virtual processors running on one or more physical processors.

For the case in which one or more virtual processors are running on a single physical processor, the single physical processor swaps between the set of N virtual processors. Each virtual processor is generally termed an Access Module Processor (AMP) in the Teradata Active Data Warehousing System.

For the case in which N virtual processors are running on an M processor node, the node's operating system schedules the N virtual processors to ran on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots _N$ manages a portion of a database that is stored in a corresponding one of the data storage facilities $120_1 \ldots _N$. Each of the data storage facilities $120_1 \ldots _N$ includes one or more disk drives. The DBS may include multiple nodes $105_2 \ldots _N$ in addition to the illustrated node $105_1$, connected by extending the network 115.

The system stores data in one or more tables in the data storage facilities $120_1 \ldots _N$. The rows $125_1 \ldots _z$ of the tables are stored across multiple data storage facilities $120_1 \ldots _N$ to ensure that the system workload is distributed evenly across the processing modules $110_1 \ldots _N$. A parsing engine 130 organizes the storage of data and the distribution of table rows
}

$125_1 \ldots _z$ among the processing modules $110_1 \ldots _N$. The parsing engine 130 also coordinates the retrieval of data from the data storage facilities $120_1 \ldots _N$ in response to queries received from a user at a mainframe 135 or a client computer 140. The DBS 100 usually receives queries in a standard format, such as SQL.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Once the session control 200 allows a session to begin, a user may submit a SQL request that is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320) that develops the least expensive plan to perform the request.

While each component in the DBS described generally at FIG. 1-3 is notionally part of a single integrated software application, the DBS is composed of a large number of components (such as the parser, the optimizer, etc.), and moreover, each component may be composed of various sub-components (or modules). The components and sub-components are arranged to operate seamlessly with each other to achieve a desired result (i.e. store and retrieve data in the database).

A modular, component based architecture is used for a number of reasons. The primary reason for modularizing a software application is to allow for easy development of a complex software application, particularly where a team of programmers are required to write different yet complimentary components which interact to form a greater whole. The modularization of code also allows changes and updates to be made to individual modules, rather than to the application as a whole. This makes the task of maintenance and development of the application easier and more intuitive.

However, in some cases, an update or change to one component will have an undesirable or regressive effect on other components in the system, or on the system as a whole. This is due to the relative complexity of a software application that is composed of hundreds or potentially thousands of modules. Despite extensive testing, in some cases, unwanted and undesirable effects can occur when a module once a module is changed. Moreover, in some cases, an update designed to fix a problem or improve the response time of a query may have a known but negative impact on another part of the system. Undoing unwanted changes, or determining whether a change should be applied at first instance, is a laborious task that requires intimate knowledge of the system.

Figure 4:
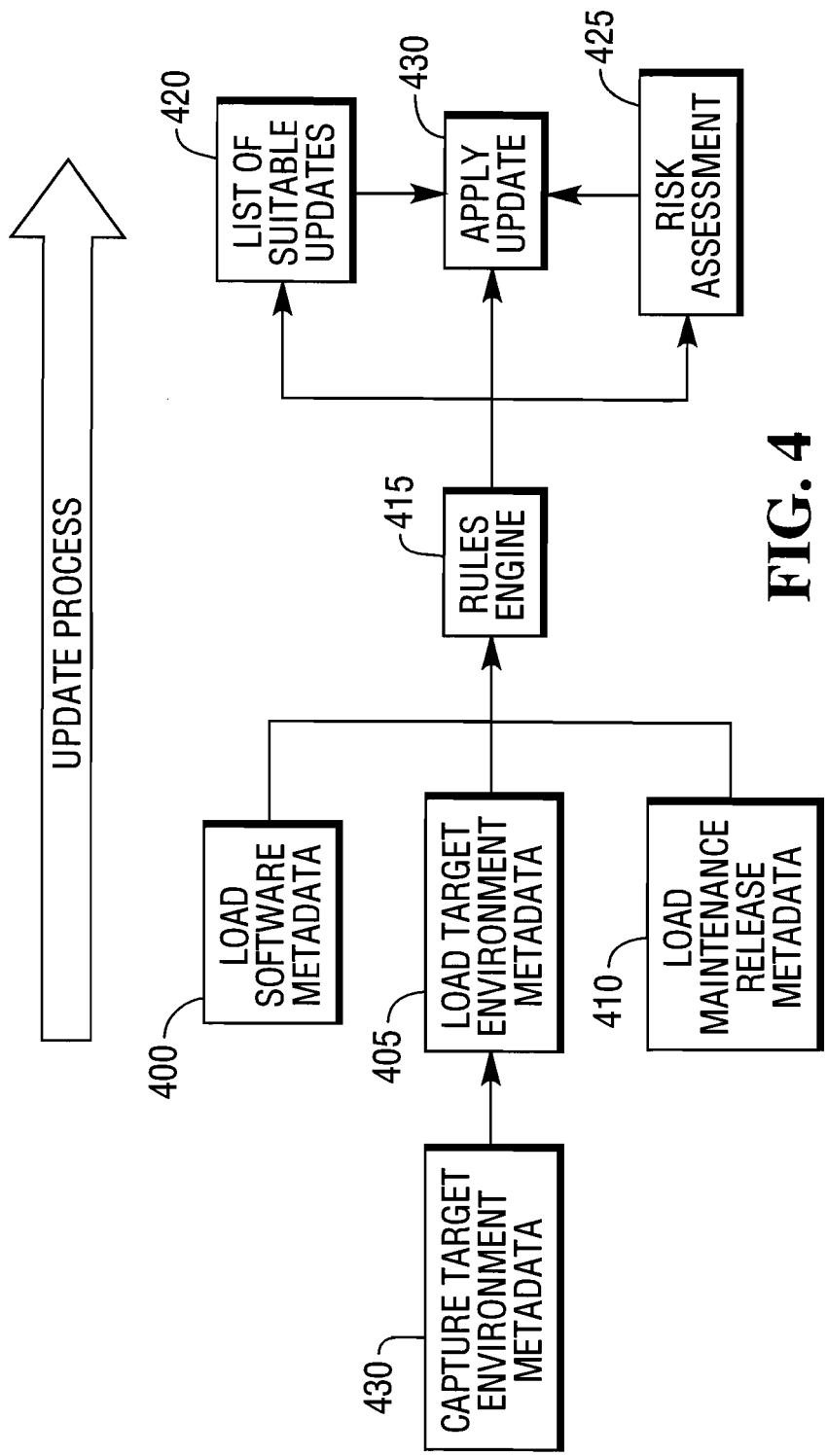
FIG. 4 is a block diagram of a method for updating system software.

The embodiment described herein (FIG. 4) provides a system and software application which receives a software structure metadata record (block 400), receives a patch or maintenance release metadata record (block 405), receives a target environment metadata record (block 410), and parses the records through a rule engine (block 415) to determine which available updates should be applied to the database system (block 420). The embodiment also provides a risk assessment (block 425), in the form of a report, so that a user or administrator is aware of the relative risks associated with performing the update. In one embodiment, the rules engine automatically applies the update (block 430).

In more detail, the software structure metadata record provides a listing of the abstract structure of the software application. The metadata record may be composed in any suitable manner, but the embodiment presented herein provides a hierarchical structure of components and component dependencies. The components of the application may also be based on other types of structures, such as class hierarchies, source directory structures, or subsystem names. An existing software tool, such as 'doxygen' (a software tool available on the Internet at URL http://www.stack.nl/~dimitri/doxygen/), may be used to build a model of the components, which may then be translated into a suitable XML (eXtensible Markup Language) or CSV (Comma Separated Values) file format.

The metadata record also defines any interrelationship between each of the components. One manner in which such interrelationships can be captured is by executing representative workloads on the software application and using a code coverage tool to monitor the components impacted.

As an example, there is shown in List 1 (below), a 'doxygen' generated list-style directory structure for the model of an open source geo-spatial software product named GEOS. GEOS is composed of eleven main components, namely 'algorithm', 'geom', 'geomgraph', 'index', 'io', 'noding', 'operation', 'planargraph', 'precision', 'simplify' and 'util'. Under some of the component names there are further names, which denote the routines/components called by the component. In this way, the interrelationships between the components are mapped. For example, 'geom' and 'util' are interrelated, in that 'geom' may call 'util'. In another example, 'noding' calls 'snapround'. Snapround is not a component, but a routine within noding (as snapround does not appear as an independent node at the top of the hierarchy).

List 1: Abstract model of software system

```
geos
    algorithm
    geom
        util
    geomgraph
        index
    index
        bintree
        chain
        quadtree
        strtree
        sweepline
    io
    noding
        snapround
    operation
        buffer
        distance
        linemerge
        overlay
        polygonize
        predicate
        relate
        valid
    planargraph
        algorithm
    precision
    simplify
    util
```

The abstract model of the software system serves to provide an instant reference to the potential impact of the modification of one component with respect to another component in the software application. For example, as geom may call util, then any update which changes the manner in which geom operates may have an effect on util.

The embodiment also includes a patch or maintenance release metadata record which defines the contents of the available updates. The metadata includes a description of the system component or subcomponent that is being updated, including dependencies, the symptoms of the issue that is being resolved and the enhancement that is being provided.

Dependencies can also include factors such as system configuration, other software component interactions (including negative interactions) and other software component release levels. The data record can be provided in any suitable format, although an XML format is utilized in the embodiment described herein.

An extract of a maintenance release metadata record is shown below in list 2.

List 2: Example extract from maintenance release metadata record

```
<root>
    <system name="geos">
        <release version="1.01">
            <component name="operation">
            <component name="distance">
                <time>2004/12/08 13:54:43</time>
                <modifier>mww</modifier>
                <categorization>performance </categorization>
                <description>enhanced algorithm to calculate distance based
                on MBR approximation</description>
                <LOC>53</LOC>
            </component>
            </component>
            <component name="index">
            <component name="quadtree">
                <time>2005/11/08 15:24:41</time>
                <modifier>rb</modifier>
                <categorization>availability</categorization>
                <description>resolved memory leak in insertion method for
                large objects</description>
                <area>
                    <operation>GT</operation>
                    <value>500</value>
                <LOC>12</LOC>
            </component>
            </component>
        </release>
    </system>
</root>
```

As can be seen from List 2, the maintenance release metadata record includes information regarding the application ('geos'), the release version, date and time of the update, the components affected by the update, a short description of the problems fixed by the update, and other operational information (such as the variables or tuning parameters affected by the update).

The embodiment described herein also accesses a target environment metadata record. The target environment metadata record is derived from the automated review of sources such as event logs, workload profile logs, configuration information and existing version information specific to the software and hardware being operated by the user. The target environment metadata record is normally collected, over a period of time, by a software application residing on the target computing system, although it will be understood that target environment metadata record can be delivered as a package or 'file' in situations where, for example, the behavior of the target computing system is known.

Alternatively, a target environment metadata record may be generated 'on the fly' from existing information stored in other disparate logs in the computing system. For example, all computer operating systems contain a number of logs or information repositories, each arranged to keep different information regarding a different aspect of the computing system. There are logs which catalogue the system hardware, the drivers used by the hardware, as well as logs that contain information regarding ongoing system activity (e.g. how many instances of an application were run in a given time period, resource usage, etc.) For example, Microsoft Windows XP™ contains a number of monitoring applications, such as 'perfinon', which can be used to collect and collate data (into a log) from a number of software and hardware system variables, such as CPU utilization, memory usage, persistent storage usage, etc. Data may be extracted from these logs, as required and translated to create an appropriate target environment metadata record.

Typically the metadata record also contains information on features used by the target environment. For example, in a relational database environment, the workload profile would include information such as the following:

1. The specific types of Data Definition Language (DDL) used, including reference to indexes, triggers, views and constraints.
2. The specific types of execution strategies commonly used by the database, including join algorithms. For example, if the database commonly utilizes a hash join strategy, then an update which increases the performance of a hash join strategy is desirable.
3. The specific types of Data Manipulation Language (DML) used, including the SQL language grammar used, predefined functions used and combinations thereof. For example, if it is known that a particular database implementation utilizes a particular version of the SQL grammar, then updating to a new grammar may cause compatibility issues.
4. The specific system conditions encountered, as recorded over a predefined time period. This may include, for example, instances where memory has run low, where long disk queues have been encountered, where high network traffic has been encountered, etc. This may assist in identifying patches or updates which are intended to solve particular problems identified in a class or version of the database system.
5. Specific instances of resource utilization that may have an impact on the updates to be installed. For example, if a particular bank of hard drives contains hot data that is accessed frequently, then a new potentially unstable driver that controls the interface for the hard drives may not be an appropriate update, as the relative benefit (i.e. potentially faster access) may be outweighed by the potential risk (i.e. the loss of data or possible downtime due to crashing of the hard drive).

The information contained in workload profiles can be utilized as the basis for extracting relevant information which can then be saved into the target environment metadata record.

A short extract of an example target environment metadata record is provided below, at list 3:

List 3: Extract from a target environment metadata record

```
<root>
<system name="node1">
<release version="1.00">
    <method name="Quadtree::insert">
        <time>2006/4/08 09:54:43</time>
        <elapsedtime>123 ms</elapsedtime>
        <area>1000</area>
    </method>
```

-continued

List 3: Extract from a target environment metadata record

```
<method name="Quadtree::insert">
    <time>2006/4/08 09:54:45</time>
    <elapsedtime>211 ms</elapsedtime>
    <area>1400</area>
</method>
        </release>
    </system>
</root>
```

The extract shown above includes information pertaining to a particular node in a computing system and a sample of the queries executed by the node. That is, from the extract, it can be seen that the 'Quadtree::insert' query was executed twice on the same day. The first time the query was executed, the time to complete the query was 123 ms, for an area of 1000. The second time the query was executed, the time to complete the query was 21 ms, but for a larger area of 1400.

This type of information can be used to determine patterns of behavior in a database system, which can in turn be used to determine whether a particular update will have a progressive or a regressive impact on the system as a whole.

The abstract model of the target environment, patch or maintenance release metadata record and the target environment metadata record are all provided to a rule based engine which compares the metadata from the three sources to produce a list of targeted recommended updates, and, in some instances, a risk assessment (where the costs and the benefits of applying an update cannot be clearly weighed up without more information).

In more detail, a set of rules are firstly registered with the engine. The rules could be delivered from an outside source, such as part of an update package or hand coded by the user or administrator of the computing system. In some embodiments, the engine parses the rules to verify the syntax and generated executable form of the rules. This step occurs, for example, where the user or administrator hand codes the rules. The rules then utilize the metadata records to determine which updates are unwanted (which are then filtered out) and which updates are validated (and applied).

The rules are based on Boolean logic. Some example rules are shown below in List 4.

List 4: Example Rule Set

```
// RULE 1 - Functionality
IF search_function('soudex') < 10 AND complexity > LOW THEN
Filter update.
// RULE 2 -- Exception Condition
IF search_errorcode(5900) = TRUE AND Version = 1.23.29 THEN
Apply update
// RULE 3 - Performance
IF find_resource(network_retires) > 1000 AND
    number_nodes > 100 THEN Apply update
```

Referring to List 4, it can be seen that each of the rules test for a particular condition, and then either filter the update or apply the update depending on the outcome of the test. For example, rule 3 determines whether the number of network tries (as defined in a log) is greater than 1000 and whether the number of nodes in the computer system is greater than 100. If both conditions are true, then the update is applied. If it is not true, then no action is taken (i.e. the update is not applied).

There may also be provided a risk assessment module which would return to the user or administrator when an update contains a mixture of desirable and undesirable events, where it is not immediately clear if the overall benefit would be beneficial. The risk assessment report could be based on any number of factors, including external factors (such as the ability of an administrator to recover the system from a negative impact, should one occur).

The embodiment described herein provides a number of advantages over conventional systems that require a user or a database administrator to apply patches or maintenance updates. Firstly, the reduced human involvement saves administrator time, while, in most cases, decreasing the likelihood of incorrect patches being applied. Secondly, as updates occur in a targeted, logical and automated manner, the required system 'down-time' is generally reduced. Lastly, the combination of providing a more accurate method for updating (thereby decreasing the chance of a regression) while decreasing the potential down-time of the database, results in increased user satisfaction.

The text above described an embodiment of an invention utilized in conjunction with a database application. The invention may also be carried out in a variety of manners across a variety of software applications.

The text above described one or more specific embodiments of a broader invention. The invention also is carried out in a variety of alternative embodiments and thus is not limited to those described here. For example, while the invention has been described here in terms of a DBS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A method for updating at least one component in a multi-component software application arranged to operate on a computing system, the method comprising: electronically by a computer receiving (i) application data describing characteristics of the software application, (ii) update data describing at least one update applicable to the software application, and (iii) workload profile data which has been collected over a period of time by a workload profile data logging application residing on the computing system, wherein workload profile data includes at least two of specific types of Data Definition Language used, specific types of Data Manipulation Language used, specific types of execution strategies, hot data which is representative of resource utilization of the computing system, and recorded data which is representative of system conditions of the computing system as recorded over a predefined time period;
    electronically by a computer selecting a number of updates to provide a list of recommended updates which can be applied to the software application based on the application data, the update data, and the workload profile data, wherein electronically by a computer selecting a number of updates includes utilizing a rule engine to compare metadata from the application data, the update data, and the workload profile data to provide the list of recommended updates which can be applied to the software application;
    and electronically by a computer applying at least one update from the selected list of recommended updates to the software application.

2. A method of claim 1, wherein the workload profile data comprises hot data which is representative of resource utilization of the computing system.

3. A method of claim 1, wherein the workload profile data comprises recorded data which is representative of system conditions of the computing system as recorded over a predefined time period.

4. A method of claim 1, wherein the workload profile data comprises data which is representative of specific types of Data Manipulation Language (DML) used, including SQL language grammar used, predefined functions used and combinations thereof.

5. A method of claim 1, wherein the workload profile data comprises data which is representative of specific types of Data Definition Language (DDL) used, including reference to indexes, triggers, views and constraints.

6. A method of claim 1, wherein the workload profile data comprises data which is representative of specific types of execution strategies commonly used by a database.

7. A method of claim 6, wherein at least one of the execution strategies comprises a hash join strategy.

8. A method of claim 1, further comprising: electronically by a computer providing a risk assessment report outlining the risk of applying at least one update from the selected list of recommended updates to the software application.

9. A method of claim 8, wherein electronically by a computer applying at least one update from the selected list of recommended updates to the software application includes electronically by a computer applying at least one update based on the application data, the update data, the workload profile data, and the risk outlined in the risk assessment report.

10. A method for updating at least one component in a multi-component software application arranged to operate on a computing system, the method comprising:
electronically by a computer receiving (i) application data describing characteristics of the software application, (ii) update data describing at least one update applicable to the software application, and (iii) logged data which has been recorded over a predefined period of time from an event log and a workload profile log, wherein workload profile log includes at least two of specific types of Data Definition Language used, specific types of Data Manipulation Language used, specific types of execution strategies, hot data which is representative of resource utilization of the computing system, and recorded data which is representative of system conditions of the computing system as recorded over a predefined time period;
electronically by a computer selecting a number of updates to provide a list of recommended updates which can be applied to the software application based on the application data, the update data, and the logged data, wherein electronically by a computer selecting a number of updates includes utilizing a rule engine to compare metadata from the application data, the update data, and the workload profile data to provide the list of recommended updates which can be applied to the software application;
and electronically by a computer applying at least one update from the selected list of recommended updates to the software application.

11. A method of claim 10, wherein electronically by a computer selecting a number of updates includes utilizing a rule engine to compare metadata from the application data, the update data, and the logged data to provide the list of recommended updates which can be applied to the software application.

12. A method of claim 11, further comprising: electronically by a computer providing a risk assessment report outlining the risk of applying at least one update from the selected list of recommended updates to the software application.

13. The method of claim 12, wherein electronically by a computer applying at least one update from the selected list of recommended updates to the software application includes electronically by a computer applying at least one update based on the application data, the update data, the logged data, and the risk outlined in the risk assessment report.

14. A method for updating at least one component in a multi-component software application arranged to operate on a computing system, the method comprising: electronically by a computer receiving (i) update data describing at least one update applicable to the software application, and (ii) workload profile data which has been collected over a period of time including at least two of specific types of Data Definition Language used, specific types of Data Manipulation Language used, specific types of execution strategies, hot data which is representative of resource utilization of the computing system, and recorded data which is representative of system conditions of the computing system as recorded over a predefined time period;
electronically by a computer (i) determining if each update will have a progressive impact or a regressive impact on the computing system, (ii) filtering out updates which will have a regressive impact on the computing system, and (iii) selecting a number of updates which will have a progressive impact on the computing system, wherein electronically by a computer selecting a number of updates includes utilizing a rule engine to compare metadata from the application data, the update data, and the workload profile data to provide the list of recommended updates which can be applied to the software application;
and electronically by a computer applying at least one update from the selected list of updates to the software application.

15. A method of claim 14, wherein electronically by a computer selecting a number of updates includes utilizing a rule engine to compare metadata from the update data to provide the list of recommended updates which can be applied to the software application.

16. A method of claim 15, further comprising: electronically by a computer providing a risk assessment report outlining the risk of applying at least one update from the selected list of updates to the software application.

17. The method of claim 16, wherein electronically by a computer applying at least one update from the selected list of updates to the software application includes electronically by a computer applying at least one update based on the update data and the risk outlined in the risk assessment report.

* * * * *